Patented Nov. 7, 1939

2,179,339

UNITED STATES PATENT OFFICE 2,179,339

ADHESIVE COMPOSITION

Julius G. Little, Wilmington, Del., assignor to Hercules Powder Company, Wilmington, Del., a corporation of Delaware No Drawing. Application September 17, 1936, Serial No. 101,229

10 Claims. (Cl. 134—23.7)

This invention relates to adhesive compositions, and in particular to resinous adhesive compositions.

Heretofore, resin adhesives possessing a tacky or sticky nature, such as pressure sealing compositions, heat-sealing compositions, fly paper, etc., have been prepared from a resin, such as rosin, plasticized with an oil, such as castor oil, a mineral oil, dibutyl phthalate, etc., by mixing the ingredients together under gentle heat. Such compositions suffer from the disadvantage that the oil employed is not compatible with the resin, and that the oil tends to sweat out or to separate from the composition, thus destroying its usefulness. Such adhesive compositions have also suffered from the disadvantage that they tend to harden or oxidize in storage and in use, and thus soon become useless for the purpose intended.

I have now found that such disadvantages as above enumerated may be wholly or substantially overcome by the use of a resinous composition adhesive comprising a resin and a hydrogenated alkyl or hydrogenated aralkyl abietate.

The resinous adhesive compositions in accordance with this invention will contain as the resinous ingredient wood or gum rosin, ester gum, hydrogenated rosin, dammar gum, manila gum, coumarone-indene resin, etc., and as the tack-forming component a plasticizer compatible with and soluble in the resin, such as a hydrogenated alkyl abietate, e. g. hydrogenated methyl abietate, hydrogenated ethyl abietate, etc., or a hydrogenated aralkyl abietate, e. g. hydrogenated benzyl abietate.

Generally, the proportion of hydrogenated, compatible plasticizer contained in my improved adhesive compositions will comprise the range of about 25 parts by weight to about 60 parts by weight in the case of the use of hydrogenated alkyl abietates, and the range of about 60 parts by weight to about 80 parts by weight in the case of the use of hydrogenated aralkyl abietates. The amount of compatible plasticizer used in my adhesive composition will be dependent, generally, upon the consistency and stickiness desired in the composition, the type of resin employed therein, the nature of the compatible plasticizer employed, and upon the use to which the composition is to be put.

Where it is desirable, in the use of certain adhesives, to render such adhesives more stable to low temperatures, less sensitive to high, summer temperatures, and such as to produce a strong, permanent bond, a film-forming ingredient may be added to the above-described resin-plasticizer adhesive. Such a film forming ingredient may be, for example, chlorinated rubber, rubber, polycyclo rubber, or pliolite, polymerized vinyl acetate chloride, ethyl cellulose, benzyl cellulose, nitrocellulose, etc.

Specific examples of pressure-sealing adhesive compositions in accordance with my invention are as follows:

|  | Parts by weight |
|---|---|
| 1. Hydrogenated methyl abietate | 50 |
| Rosin | 50 |
| 2. Hydrogenated ethyl abietate | 50 |
| Dammar gum | 50 |
| 3. Hydrogenated methyl abietate | 30 |
| Hydrogenated rosin | 70 |
| 4. Hydrogenated ethyl abietate | 40 |
| Coumarone-indene resin | 60 |
| 5. Hydrogenated methyl abietate | 30 |
| Ester gum | 70 |
| 6. Hydrogenated methyl abietate | 60 |
| Manila gum | 40 |
| 7. Hydrogenated benzyl abietate | 70 |
| Rosin | 30 |
| 8. Hydrogenated benzyl abietate | 60 |
| Ester gum | 40 |

Specific examples of heat-sealing resinous adhesives in accordance with this invention are:

|  | Parts by weight |
|---|---|
| 1. Hydrogenated methyl abietate | 25 |
| Manila gum | 75 |
| 2. Hydrogenated ethyl abietate | 15 |
| Ester gum | 85 |
| 3. Hydrogenated methyl abietate | 20 |
| Dammar gum | 80 |

Such adhesives, due to their lower content of plasticizer, are less tacky than the adhesives previously described, and require the application of heat and pressure in their use.

Specific examples of resinous adhesive compositions containing a film-forming ingredient, and of a nature to soften less readily at high atmospheric temperatures and to form, in use, a more permanent bond, are as follows:

|  | Parts by weight |
|---|---|
| 1. Hydrogenated methyl abietate | 34 |
| Rubber | 6 |
| Rosin | 60 |
| 2. Hydrogenated ethyl abietate | 40 |
| Rubber | 10 |
| Hydrogenated rosin | 50 |
| 3. Hydrogenated methyl abietate | 40 |
| Polycyclo rubber | 8 |
| Coumarone-indene resin | 52 |
| 4. Hydrogenated methyl abietate | 40 |
| Ethyl cellulose | 8 |
| Hydrogenated rosin | 52 |
| 5. Hydrogenated methyl abietate | 46 |
| Vinyl acetate-chloride polymer | 6 |
| Dammar gum | 48 |
| 6. Hydrogenated ethyl abietate | 60 |
| Chlorinated rubber | 12 |
| Coumarone-indene resin | 28 |

Such adhesives as the above find use as permanent bonding agents, e. g. in permanently adhering layers of cloth or other fabric to one another, adhering paper or fabric to metal, etc.

The resinous compositions in accordance with this invention will be conveniently prepared by blending together the ingredients by gentle heat, with or without the use of a solvent.

What I claim and desire to protect by Letters Patent is:

1. A pressure-sensitive, non-hardening adhesive composition consisting of a tacky mixture comprising a liquid organic hydrogenated abietate present in an amount within the range of about 25% to about 80% by weight of said composition and a resin forming at least the major portion of the remainder of the composition.

2. A pressure-sensitive, non-hardening adhesive composition consisting of a tacky mixture comprising a liquid organic hydrogenated abietate present in an amount within the range of about 25% to about 80% by weight of said composition and a resin forming at least the major portion of the remainder of the composition which includes not in excess of about 8% by weight, of the total composition, of a cellulose derivative selected from the group consisting of ethyl cellulose, benzyl cellulose and nitrocellulose.

3. A pressure-sensitive, non-hardening adhesive composition consisting of a tacky mixture comprising a liquid hydrogenated alkyl abietate present in an amount within the range of about 25% to about 60% by weight of said composition and a resin forming at least the major portion of the remainder of the composition.

4. A pressure-sensitive, non-hardening adhesive composition consisting of a tacky mixture comprising a liquid hydrogenated alkyl abietate present in an amount within the range of about 25% to about 60% by weight of said composition and hydrogenated rosin forming at least the major portion of the remainder of the composition.

5. A pressure-sensitive, non-hardening adhesive composition consisting of a tacky mixture comprising hydrogenated methyl abietate present in an amount within the range of about 25% to about 60% by weight of said composition and hydrogenated rosin forming at least the major portion of the remainder of the composition.

6. A pressure-sensitive, non-hardening adhesive composition consisting of a tacky mixture comprising a liquid hydrogenated alkyl abietate present in an amount within the range of about 25% to about 60% by weight of said composition and a resin forming the major portion of the composition which includes not in excess of about 8% by weight, of the total composition, of a cellulose derivative selected from the group consisting of ethyl cellulose, benzyl cellulose and nitrocellulose.

7. A pressure-sensitive, non-hardening adhesive composition consisting of a tacky mixture comprising a liquid hydrogenated alkyl abietate present in an amount within the range of about 25% to about 60% by weight of said composition and hydrogenated rosin forming the major portion of the remainder of the composition which includes not in excess of about 8% by weight, of the total composition, of a cellulose derivative selected from the group consisting of ethyl cellulose, benzyl cellulose and nitrocellulose.

8. A pressure-sensitive, non-hardening adhesive composition consisting of a tacky mixture comprising a liquid hydrogenated alkyl abietate present in an amount within the range of about 25% to about 60% by weight of said composition and hydrogenated rosin forming the major portion of the remainder of the composition which includes not in excess of about 8% by weight, of the total composition, of ethyl cellulose.

9. A pressure-sensitive, non-hardening adhesive composition consisting of a tacky mixture comprising hydrogenated methyl abietate present in an amount within the range of about 25% to about 60% by weight of said composition and hydrogenated rosin forming the major portion of the remainder of the composition which includes not in excess of about 8% by weight, of the total composition, of ethyl cellulose.

10. A pressure-sensitive, non-hardening adhesive composition consisting of a tacky mixture comprising hydrogenated methyl abietate present in an amount within the range of about 25% to about 60% by weight of said composition and a resin forming the major portion of the remainder of the composition which includes not in excess of about 8% by weight, of the total composition, of a cellulose derivative selected from the group consisting of ethyl cellulose, benzyl cellulose and nitrocellulose.

JULIUS G. LITTLE.